March 7, 1961 KIYOSHI INOUE 2,974,215
MACHINING METHOD AND MEANS
Filed May 1, 1959
2 Sheets-Sheet 1
Fig. 1.
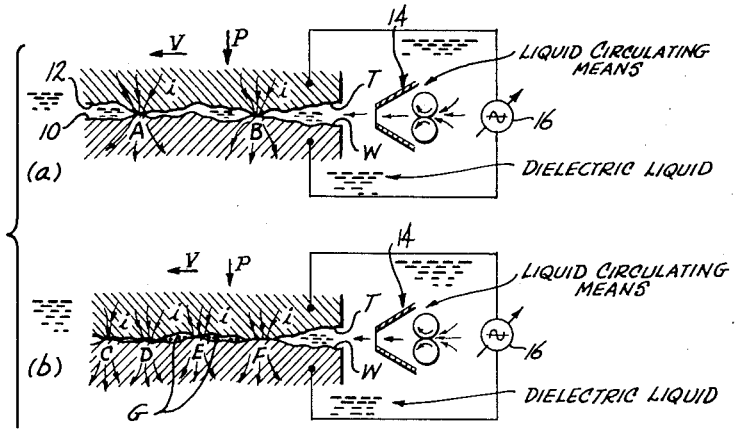
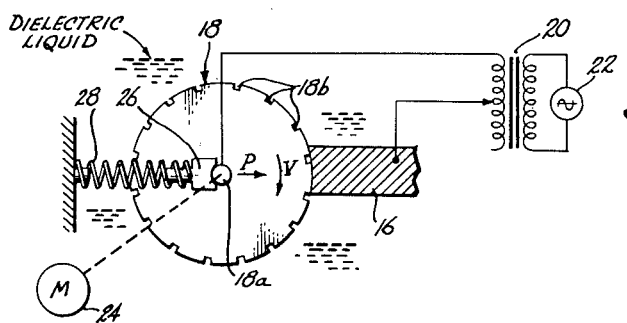
Fig. 2.
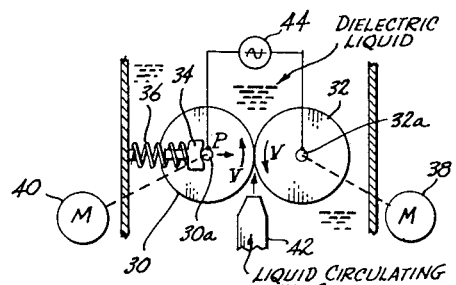
Fig. 3.
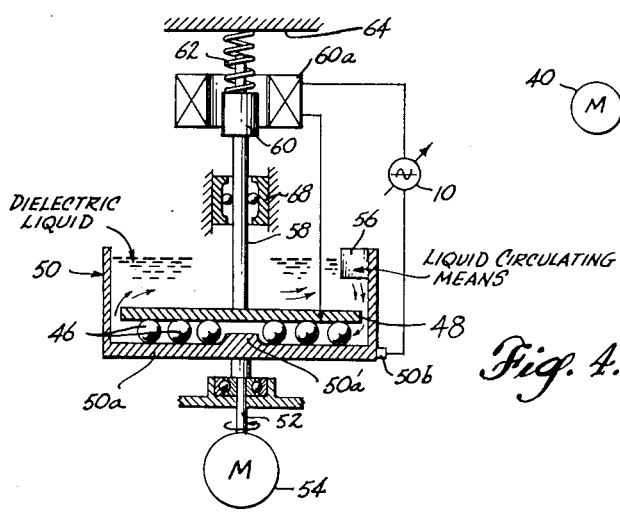
Fig. 4.
INVENTOR.
KIYOSHI INOUE
BY
Reynolds, Beach & Christensen
ATTORNEYS

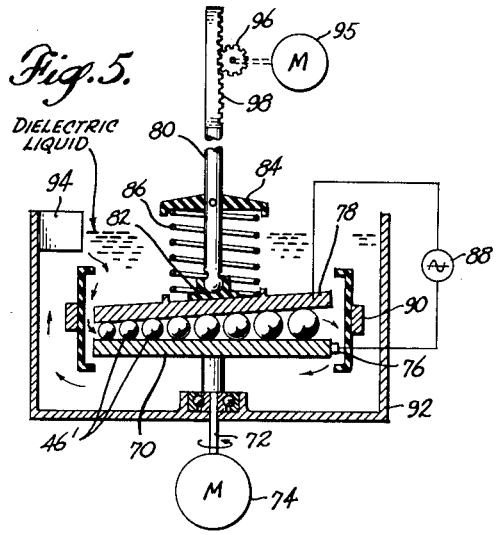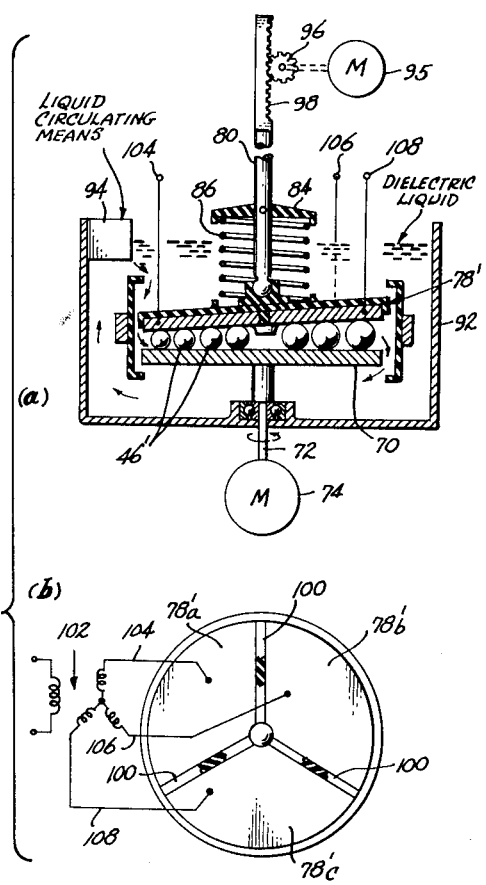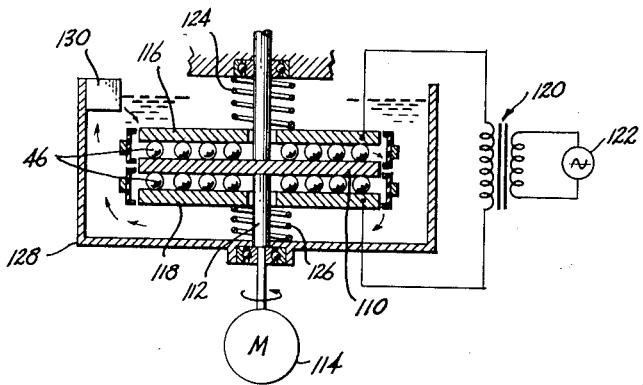

United States Patent Office 2,974,215
Patented Mar. 7, 1961

2,974,215

MACHINING METHOD AND MEANS

Kiyoshi Inoue, 182 Yoga Tamagawa, Setagaya-ku, Tokyo, Japan

Filed May 1, 1959, Ser. No. 810,327

14 Claims. (Cl. 219—68)

This invention relates to improvements in methods and apparatus for grinding or machining metal surfaces and more particularly concerns a new technique involving the combined effects of an electrical discharge and mechanical action at the surface being worked. The invention is herein illustratively described by reference to illustrative and preferred embodiments thereof; however, it will be recognized that certain modifications and changes therein with respect to details may be made and that the applications of the inventive principles involved may be varied without departing from the essential features thereof.

A large amount of research and development work has been applied to the technique of cutting metal by producing an electric spark or discharge between the metal surface and an opposing electrode of a desired shape to be imparted to the work piece. In that process the work piece and the electrode are immersed in a dielectric fluid such as water glass, boric acid, borax solution, oil, etc., and, through a suitable feed mechanism, the electrode and work piece are advanced toward each other at the necessary rate in order to provide slight contact pressure or form a microscopic gap between them so as to permit the relatively projecting points or protuberant regions to sustain an electric spark discharge which results in the corrosion or erosion of the metal surface, whereas the less relatively projecting areas are insulatively protected by a film which covers the surface of the discharge electrode because of electrolysis and the generation of heat in the spark regions. In that process it is necessary to provide a definite and fixed polarity between the electrode and the work piece and to apply the electric discharge energy in the form of discrete pulses of the described polarity. In the prior process referred to above, the rate and amount of motion between the work piece and electrode are so slight that the cutting or metal removal action is due entirely to the spark discharge process with reliance being placed upon circulation of liquid through the spark gap region as a means of removing the atomized metal or reaction product thereof. The conditions are such that the rate of cutting is not enhanced by mechanical action except in order to maintain the necessary spark gap clearances by reason of the mechanical feed. The process is slow in relation to the new and improved process to be described herein.

The present invention comprises an electro-mechanical grinding or machining technique utilizing dielectric immersant liquid circulating between the acting surfaces, and the combined action of electric contact resistance heating to soften and melt projecting surface irregularities and mechanical pressure and relative rubbing motion to flatten, offset and remove the resulting softened and melted materials, some of which form particles or globules which themselves function as an abrasive during continuation of the process.

A broad object of the present invention is to provide a more efficient and economical process for grinding or machining metal than usual methods including abrasive grinding or cutting with a bit.

Another object is such a process wherein, by reason of the novel combination of electrical and mechanical action at the working surface of the metal, it becomes possible to grind and polish metal balls and other objects in a single process or stage, whereas by conventional methods the balls were first de-scaled, then rough ground and finally finish ground, in three distinct steps, consuming time and involving more expensive and less efficient apparatus than that presently to be described.

A further object is a relatively simple and inexpensive grinding technique, both in terms of apparatus requirements and in the method of operation thereof, and also in terms of the dielectric liquid used therein as an immersant. In this connection the present invention makes possible the direct use of alternating current at standard commercial frequency and does not require that the work piece and electrode be placed at a fixed relative polarity nor that constant polarity pulses be employed for the purpose, as in purely spark discharge type machining, although it should be understood in this regard that periodic pulses or direct current, for that matter, are not precluded from use in the present process.

The present invention proves to be less expensive and more versatile than mechanical grinding using grinding stones or wheels, particularly diamond surfaced wheels which were formerly necessary for grinding certain objects such as tungsten alloy tool bits and the like. In this regard, the present apparatus may be readily adjusted or controlled to impart any desired degree of polish or smoothness to the working surface of the metal without changing the electrode; moreover, the same apparatus is efficiently applicable to different metals and alloys without regard to hardness thereof.

A specific object of the invention is an electric discharge process for removing metal as described herein making feasible the use of plain water as the dielectric immersant liquid, whereas spark machining processes heretofore proposed or used normally required more expensive liquids.

Another object is a machining or grinding process which imparts additional hardness to the finished surface produced thereby. Such a process is therefore particularly well suited to the grinding of tool bits, balls for bearings, cylinders for bearings, and similar metal articles.

Another object is a process which permits achieving a higher degree of polish on the finished metal surface in a given amount of time than with conventional processes.

A specific object is to provide apparatus producing the combined mechanical and electrical action and permitting use of a rotary contact element subject to electric current flow without necessity of employing electric contact brushes in order to carry current to the element.

These and other features, objects and advantages of the invention will become more fully evident from the following description thereof by reference to the accompanying drawings.

Figure 1 is a functional illustration of the operating principles of the invention in certain aspects, part (*a*) functionally illustrating an initial phase in the metal removal process and part (*b*) functionally illustrating a succeeding phase therein.

Figure 2 is a simplified diagram illustrating the operating principle of the invention applied to the machine of a work piece using a rotated electrode with integral means for circulating dielectric liquid past the working surface.

Figure 3 is a simplified diagram illustrating application of the invention to the simultaneous grinding or machining of two cylindrical work pieces, each of which serves as the electrode for the other in the process.

Figure 4 is a simplified diagram of apparatus for grinding metal balls in accordance with the invention.

Figure 5 is a diagram of modified apparatus for grinding metal balls, particularly where the balls differ in diameter.

Figure 6, part (a), illustrates a modification of apparatus generally similar to that shown in Figure 5 but with modified electrode arrangements, and Figure 6, part (b), a bottom view of the upper electrode assembly, illustrates an arrangement and electrical connections of separate electrode segments in the same apparatus.

Figure 7 is a view similar to that of Figure 5, showing still another modification with different electrode arrangements particularly suited for the grinding of metal balls simultaneously in a plurality of different compartments in the apparatus.

Referring to Figure 1, a greatly enlarged fragmentary section of a surface portion of a metal work piece 10 is shown in engagement with a similarly enlarged surface portion of the opposing electrode 12. Initially the surfaces of both of these elements, and particularly of the work piece 10, will have irregular projections or protuberances such as A and B which engage opposing portions of the electrode surface to establish discrete points of contact whereas the general surface area of the elements will be out of contact. As to the areas which are out of contact, the gap or space between the opposing surfaces is filled or occupied by a dielectric immersant liquid as illustrated. During the process this liquid is preferably circulated through the gap, either or both by externally applied circulation force or by virtue of the rubbing motion of one surface against the other. In some instances relative motion between the surfaces provides adequate circulation whereas in others separate means such as that designated 14 in the figure are provided for the purpose. A suitable electric power supply source 16 is connected to the electrode and work piece to impress voltage therebetween. This voltage may be alternating voltage, direct voltage, or pulsating direct voltage, but for reasons of convenience and economy is preferably alternating voltage at standard commercial frequency, a consideration which makes the invention particularly attractive. In addition to these conditions, pressure is applied as indicated by the arrow P so that the contact between surface elements of the electrode and work piece is made under some pressure. As a further condition one of the elements, such as the electrode 12, is moved relative to the other element at a substantial rate in the direction generally parallel to their interengaging surfaces.

In Figure 1(a) it will be evident that the application of voltage from source 16 produces electric current flow $i$ concentrated in the regions representing the points of contact between the surfaces, the remaining or intervening areas being insulated from each other by the dielectric liquid. Certainly the heaviest current flow occurs in the points of direct physical contact and if there is any current flow between the intervening areas which are out of contact with each other, it will be by way of spark discharge (if the applied voltage is sufficiently high) and the current will be of less intensity. Any spark discharge current flowing will have no adverse effect but will produce certain additional peaks and craters in the working surfaces which tend to level out more substantial surface irregularities and thereby will supplement or accelerate the principal grinding action. At voltages in the higher regions of the operating range of the apparatus (high voltages are used for greater rates of grind and coarser grinds as later mentioned) there will be some of this spark discharge action taking place along with the principal action of the process; however, in most instances the voltages are too low for this side effect to become appreciable. In the primary process the highly concentrated or localized flow of current between the opposing surfaces at the points of contact is caused to be sufficient at the electric contact resistances encountered to heat the contact points to softening temperatures and, at the very extremities, to melting temperatures. To accomplish this, the voltage source 16 has a relatively high current capacity and low internal resistance. A suitable voltage source meeting these requirements is an ordinary welding transformer, for example. A typical operating voltage for apparatus employing the invention is in the vicinity of 10 volts, whereas peak load currents of the order of 1000 or 2000 amperes are readily provided and will be effective to produce practicable rates of grind in most applications.

Because of the presence of pressure P and velocity V the melted contact tips of the electrode and work surface are pressed down or flattened, offset into adjacent valleys or depressions and, to some extent, removed in small particles or globules. This combined flattening and abrading action results in a surface configuration typified as in Figure 1(b). The small particles or globules G are, to some extent, carried away by the general movement of the circulated dielectric liquid but in the process of moving in the space between the surfaces serve as an abrasive. The presence of the dielectric liquid cools and hardens these elements and the surface areas so that they indeed function effectively as an abrasive, thereby enhancing the more basic combined surface grinding and smoothing action of the system. In succeeding stages typified as in Figure 1(b) there still remain minute irregularities and projections, designated C, D, E, F, etc., which are in contact with the opposing surface of the electrode, and these, of course, become progressively smaller and more closely spaced as the process continues. These points of projection become the new points of short circuit contact between the surfaces, in which the current flow is now concentrated. The action is therefore a progressive action imparting an increasing degree of smoothness to both surfaces and particularly the surface of the work piece 10.

It must be emphasized, however, that the grinding action does not depend upon the condition (i.e., roughness, smoothness, conductive metal used, etc.) of the electrode surface, since the latter is not an abrasive grinder in the usual sense.

The presence of cooling liquid in the gap between the surfaces is indispensible to prevent overheating of the surfaces and to carry away the metal particles which are removed in the process as well as to function as a carrier or grinding liquid for the abrasive metal particles.

As suggested in the figure, the voltage applied to the elements may be varied. Increasing the source voltage has the effect of increasing the coarseness of grind, but speeding up the process to attain a grind of that degree. Voltage therefore is selected to meet the finish requirements of the work piece and also the speed requirements. Voltage may be progressively decreased during the process, if desired, to obtain rapid initial grinding followed by a refined polishing grind.

It is obvious at this point that the process applies to the grinding or machining of conductive materials only. By the same token, it follows that the electrode must, of course, be conductive and is usually a plain metal electrode. While many types of metals will serve as electrodes for the process, cast iron is particularly well suited to it and is desirable because of its relatively low cost.

The dielectric liquid employed in the process may be of any of different types which for reasons of safety should exclude inflammable liquids because of the high temperatures reached at the metal surfaces. Typical of suitable liquids are water, anti-corrosive water, transformer oil, lubricating oil, various electrolytes, etc. Ordinary tap water, in most cases, will do vary well.

In Figure 2 there is illustrated a simplified apparatus for grinding a tool bit 16. In this instance the dielectric liquid is or may be a transformer oil, for instance, the rotary cylindrical electrode 18 being in frictional sliding contact with the tool bit and the resistance to rotation of the wheel being decreased by the presence of oil as the dielectric liquid. The grinding wheel 18 is maintained in continuous rotation by the drive unit 24 while it is pressed by means of the journal 26 and spring 28 into firm contact with the tool bit 16 being ground. The wheel shaft 18a is suitably mounted by means not shown to permit movement thereof toward and from the tool bit so as to permit a continuation of the surface contact pressure represented by the force vector P. Alternatively, the grinding wheel may be stationary and the tool bit may be pressed against the grinding wheel by a separate force applying means. The entire operation is conducted under an immersant dielectric liquid which, due to rotation of the wheel 18 by motor 24 and the provision of notches 18b in the periphery of the wheel, carries the liquid past the tool bit surface being ground. Additional or auxiliary circulation means for the dielectric liquid may also be employed if desired. Voltage is applied by a variable welding (current) transformer 20 energized from an A.C. power source 22.

Brass or any of various other metals may be used as the electrode. The tool bit 16 may be any of different bit materials, a typical example of which is a cemented material known as Tungaloy S which is extremely hard and difficult to grind by ordinary means. However, when ground by the present invention the grinding is effected practically as easily as with the softer metals and at a rapid rate. Furthermore it is found as a by-product of the novel process that the grinding action has the significant effect of increasing the hardness of the ground surface or edge of the tool bit due, perhaps, to a localized tempering action caused by the heat, or possibly to other less readily explainable conditions arising in the process. In any event, it is found that when a bit is ground by this process, its useful life when operated at average cutting speeds is approximately twice that which is obtained when the same bit is ground by a diamond surfaced grinder wheel.

However, when applying the invention as illustrated in Figure 2 to the grinding of cemented bits or other extremely hard materials which must have a fine and accurately formed edge the rate of grind or metal removal should be limited below the maximum attainable. It is found that a removal rate of about 0.01 gram per minute in the case of an average size mill or lathe bit is near the upper limit, and that exceeding this rate materially produces irregularities in the ground edge. The rate of grind is, of course, determined primarily by the applied voltage, as previously explained, and the maximum rate will differ under different conditions (i.e. area of surfaces in contact, materials used, etc.). When grinding at this recommended upper rate the surface roughness produced is approximately 1.2 microns from peaks to valleys.

When using conventional diamond surfaced wheels for grinding the coarseness or smoothness of the grind is determined by the choice of grinding wheel surface, and different wheels must therefore be available to cover the range of requirements. However, in the present case a single wheel, such as a cast iron wheel costing approximately one percent of the cost of a single diamond grinding wheel, may be used and will serve for all degrees of roughness required simply by varying the applied voltage.

In the case of tungsten carbide tool bits it is also important to limit the applied voltage in order to gain increased grinding speed, because at higher voltages tungsten carbide tends to develop hair cracks. Taking this into consideration a machining speed, with average size tool bits, of 0.3 to 0.4 gram per minute, producing a surface roughness of approximately 20 microns maximum, is considered to be a safe maximum grinding speed for tungsten carbide.

In Figure 3 there is illustrated a technique by which two work pieces 30 and 32 may be ground simultaneously in cooperation with each other and without necessity for a separate electrode. In this instance the cylindrical work piece 30 is mounted on a shaft 30a and the work piece 32 is mounted on a shaft 32a. A suitable means, such as the journal 34 actuated by a spring 36, urges one of the work pieces (30) into physical contact with the other work piece. In this instance the work piece 30 is rotated in the direction of the arrow by a motor 38 whereas the work piece 32 is rotated in the direction of its arrow by the motor 40, in a direction opposite to the work piece 30, so that the surfaces are moved in sliding, abrading contact with each other. The dielectric liquid indicated in the figure is preferably circulated forcibly into the space between the work pieces by a suitable means 42. Alternating voltage from a source 44 is applied to the contra-rotating cylinders. Under these conditions the two metal cylinders grind each other in accordance with the operating principles described above.

In Figure 4 the invention is applied in a practical case to the grinding of metal balls, one of the difficult and expensive industrial operations when performed by present conventional techniques. In this instance the metal balls 46 are received in the space between opposing circular plates 48 and 50a, the plate 50a comprising the bottom of a cylindrical container 50 having sides which project upward beyond the edges of the circular plate 48 in order to form a container for the dielectric liquid as shown and a retainer for the balls. The container 50 is mounted on a shaft 52 driven in rotation by a motor unit 54. A suitable means 56 mounted in the container or associated therewith is provided to circulate the dielectric liquid in the space occupied by the balls 46 between the two circular plates.

The circular plate 48 is non-rotatively mounted on a rod or shaft 58 which, at its upper end portion, carries a ferromagnetic plunger or slug 60. The shaft 58 and with it the plunger 60 and the plate 48 are urged downwardly by means of the compression spring 62 bearing upwardly against the surface 64. This establishes desired grinding pressure against the balls.

The plunger 60 comprises the slug or armature of a solenoid device comprising the coil 60a surrounding it and connected in series with the electrode plates 48 and 50a across the power source 10. The upper electrode-plate 48 is free to move up and down in guide means 68, thereby to permit establishing and maintaining the desired physical contact pressure against the balls. The power source 66 may be an alternating current source, a direct current source or a pulsating direct current source, if desired.

As the container 50 is rotated by the motor 54 the metal balls are rotated in the circuit around the projecting central portion 50a' of plate 50a, partly sliding and partly rolling on the two circular plates. During such movement the flow of electric current through the circuit comprising the coil 60a, the upper electrode 48, the balls, the lower electrode 50a and the power source 66 produces localized heating and melting of contact points on the ball surfaces with consequent flattening and abrasive action thereon according to the principles previously described, in order to de-scale, grind and polish the balls in progressive manner. If, for any reason, excessively prolonged and heavy average current tends to flow through the balls at any time, which might tend to overheat them, the resulting increased magnetic attraction exerted by the solenoid 60a on the plunger 60 opposes the force of the spring 62 and thereby decreases the pressure of contact against the balls so as to increase the contact resistance and thereby reduce the average current. This automatic regulatory action depends upon the inertia of the armature or plunger 60 and upon the intensity and duration of the excessive current flow. The inertia of the plunger 60 and the strength of the spring 62 may be chosen, relatively, in order to provide the desired regulatory or limiting action. As indicated by the arrow applied to the power source 66 the voltage applied by such source may be made variable or subject to regulation if desired in order to impart the desired finish to the balls and to regulate the grinding speed.

In a single operation using the apparatus in Figure 4 the de-scaling, rough grinding and finishing operations are performed between 20 and 30 times faster than by conventional processes. Moreover, these speeds are attainable regardless of the hardness of the balls.

In the apparatus shown in Figure 4 the arrangements permits grinding balls of substantially the same diameter. However, in Figure 5 apparatus is illustrated by which balls of different diameters may be ground simultaneously between the same relatively rotated electrode plates. In this instance, the rotating lower electrode 70 mounted on a vertical shaft 72 and driven by a motor 74 is engaged by a sliding electrical contact brush 76, whereas the upper electrode plate 78 is mounted on the lower end of a depending vertical shaft 80, with a universal pivoted connection 82 between the lower end of the shaft 80 and the hub of the disk electrode 78. A flange 84 is mounted in fixed position on the shaft 80 and a coil spring 86 is interposed between such flange and the upper side of the electrode disk 78. The two disks 78 and 70 are connected across the alternating voltage source 88. A retainer ring 90 encircles the annular space defined between the two disks to prevent the balls from jumping out of that space and the entire assembly is immersed in a dielectric liquid in a container 92 having a suitable means 94 for circulating the liquid in the space between the electrodes. A torque motor 95 operating through a pinion 96 and gear rack 98 comprising part of the shaft or rod 80 continuously urges the shaft downwardly and hence urges the upper electrode disk 78 with the desired grinding pressure against the balls 46' which are interposed between the two disks.

With balls 46' of different diameters interposed between the two disk electrodes, rotation of the lower electrode 70 initially causes the balls to shift about irregularly with only the larger balls initially rotating and the smaller balls being moved about by the larger ones. However, as rotation continues the balls tend to group themselves by diameters until they are regularly arranged in the gap between the two disk electrodes, from the smallest at one side to the largest at the opposite side. This result obtains from the continuous pressure applied by shaft 80 downwardly and the flexibility of the universal joint 82 as well as the presence of the compression spring 86 tending to maintain uniform pressure on the regularly arranged balls over the entire area of the disks. Under these conditions, which are inherently assumed and maintained in such apparatus during continuation of the grinding process, the balls rotate uniformly and are ground uniformly to substantially the same degree of surface finish regardless of the diameter of the balls. Moreover, the system does not tend to grind all the balls to the same diameter but to grind all to the same surface finish while retaining the relative diameters possessed at the outset.

In the modification shown in Figure 6 arrangements are made to eliminate the use of a sliding brush contact between one terminal of a power source and a rotating electrode in the ball grinding system. In this arrangement, which in a number of respects may be similar to that shown in Figure 5, and to that end like parts bear similar reference numerals, the upper disk electrode, which is the stationary electrode, is segmented, the segments being designated 78'a, 78'b, and 78'c and being insulated from each other by the insulating strips 100. These segments are connected through the respective conductors 104, 106 and 108 to the three output terminals of an alternating current source 102 such as the three-phase transformer or alternator indicated in the diagram. Electric current flow through the balls is established between the different segments of the upper electrode disk 78' through the balls and the lower, rotated electrode disk 70, which serves as a "floating" electrode or conductive return path between any two upper electrode segments, so as to permit flow of three-phase current through constantly changing groups of balls moving successively beneath the different upper electrode segments. In this manner the rotating disk 70 requires no electrical contact but may float in potential or may be placed at ground potential whereas the segmented electrode need not rotate.

While in Figure 6 the technique of employing a segmented stationary electrode with a floating rotary electrode uses three-phase alternating current, it is obvious that two-phase, single phase, or any larger number of phases may be employed with a like number of segments, along the same lines. An advantage of this arrangement is the simplicity of the structure and the reduction of energy losses which takes place in the use of sliding contact brushes. In addition, the technique need not be limited to the grinding of metal balls but may be applied in other instances as well.

In Figure 7 the ball grinding apparatus features have been incorporated in a multistage or multicell system illustrating another multielectrode arrangement in which sliding contact brushes are unnecessary. In this instance the rotating portion of the system comprises the circular disk 110 mounted on a shaft 112 driven in rotation by a motor unit 114. The disk 110 serves as a floating rotational electrode interposed between stationary energized electrodes comprising an upper electrode 116 and a lower electrode 118. The electrodes 116 and 118 are connected across the output terminals of the alternating current transformer 120 energized from a source 122. Balls 46 to be ground by the apparatus are interposed in the spaces between the stationary and rotational disks and, by means of springs 124 and 126, the respective disks 116 and 118 are urged toward each other and into forcible contact with the balls pressing them against the opposing faces of the intermediate disk 110. The entire assembly is immersed in dielectric liquid in a suitable container 128 which incorporates suitable means 130 to circulate the dielectric liquid in the spaces occupied by the balls being processed. It will be evident that the flow of current through the balls takes place between the stationary energized electrode disks 116 and 118, whereas the intermediate disk 110 functions as a floating electrode or conductive bridge and requires no electrical sliding contact for its intended function. This same principle may be applied to the grinding of balls of different diameters simultaneously, along the lines described in conjunction with Figure 5, if desired.

It will, therefore, be recognized from the preceding description of the invention and its preferred embodiments which have been simplified somewhat for purposes of convenient description and ease of understanding, that a number of important advantages flow from the novel concepts involving the simultaneous use of electric contact heating of mechanically rubbing elements, with a dielectric liquid circulated in and through the gap between the contacting elements during the process. The novel principles involved may be applied in various forms of apparatus and the conditions of operation will vary widely depending upon the materials used, the desired finish required, the rate of grind required, conditions to be avoided such as hair line cracking in tungsten carbide materials, and other factors which must be considered in different types of applications. Because of the many variables it is, of course, impossible to prescribe arbitrary operating conditions which will produce optimum results in every case. The foregoing description, however, will suffice to provide an understanding of the invention to those skilled in the art and will serve as a basis from which to determine optimum conditions in different cases.

These and other aspects of the invention will be apparent to those skilled in this art.

I claim as my invention:

1. The method of grinding round metal articles between opposing metal surfaces comprising pressing the surfaces into contact with the articles immersed in a dielectric liquid, effecting relative motion between the surfaces in a direction generally parallel to one of the surfaces thereby to roll said articles between said surfaces, and simultaneously with such pressure and such motion applying voltage between such surfaces to pass a strong electric current through the articles therebetween sufficient to soften and melt surface irregularities on the articles during such rolling motion, thereby to flatten and remove such irregularities progressively as the process continues.

2. Apparatus for grinding metal work, comprising electrode means adapted to engage the work, means operable to effect relative movement between the work and the electrode means in the direction of extent of the contacting portions thereof while urging the same relatively together into direct surface to surface contact, means immersing the contacting surfaces in a dielectric liquid, said electrode means comprising a plurality of separately insulated elements, and electric current supply means having a plurality of output conductors connected respectively to said electrode elements to pass relatively heavy electric current therebetween and through the work contacted thereby, with the work affording a conductive path between said electrode elements, thereby to heat at least to softening temperatures contacted surface irregularities on the work accompanying such relative movement and immersal.

3. The apparatus defined in claim 2, wherein the electrode means are stationary and the means to effect relative movement comprises movable separate electrode means also contacting the work and operable to move the work relative to the electrode elements.

4. The apparatus defined in claim 3, wherein the work comprises a plurality of round metal articles and the movable separate electrode means comprises a rotary conductive backing plate engaged by such articles to maintain the same in contact with the electrode elements.

5. The apparatus defined in claim 3, wherein the electrode elements comprise parallel plates and an interposed rotative plate parallel to the electrode plates and the work comprises a plurality of metal balls interposed between and contacting both sides of the rotative plate and the respective electrode plates, such rotative plate being rotated by the means to effect relative motion.

6. The apparatus defined in claim 2, wherein the electrode means comprises rotary circular plate means and the work comprises a plurality of metal balls of different diameters backed by rotary circular plate means generally parallel to and coaxial with the first-mentioned circular plate means, the means to effect relative motion being operable to rotate one such circular plate means, and means supporting the other such circular plate means to permit tilting thereof while urging the same yieldably toward a position parallel with the other circular plate means, whereby the balls are permitted to arrange themselves in series graduated by diameters as the rotation continues, with all balls mutually contacted by both circular plate means.

7. The apparatus defined in claim 6, wherein the electrode circular plate means comprises a plurality of segments insulatively mounted and respectively connected to the output conductors, and comprises the tiltable circular plate means.

8. Apparatus for descaling and polishing metal balls comprising a rotary electrode, an opposing second electrode spaced from said rotary electrode to receive the balls in such space, means urging one such electrode toward the other to apply steady contact pressure to such balls, drive means rotating one such electrode relative to the other for rotating the balls while in contact with the surfaces of both electrodes, means immersing the balls and electrode in a dielectric liquid, and a source of electric discharge energy having output terminals respectively connected to at least one of said electrodes for passing electric discharge current through the rolling immersed balls at their points of contact with the electrode surfaces.

9. The apparatus defined in claim 8, wherein the electrodes have flat annular ball-contact surfaces.

10. The apparatus defined in claim 9, in which the second electrode comprises a plurality of separately insulated ball-contact surface portions to which the source terminals are respectively connected, whereby a circuit for flow of current between such terminals extends serially through balls in contact with one such surface portion, the rotary electrode, and balls in contact with another such surface portion.

11. The apparatus defined in claim 10, wherein the second electrode is non-rotative and is mounted to pivot universally relative to the rotary electrode about any of different axes extending transversely to the latter's rotational axis, thereby to permit balls of different diameters to arrange themselves by diameters along the space between the electrodes by tilting of the second electrode relative to the rotary electrode, said second electrode thereby wobbling as the rotary electrode rotates to roll and polish the balls.

12. The apparatus defined in claim 9, wherein the second electrode is non-rotative and is mounted to pivot universally relative to the rotary electrode about any of different axes extending transversely to the latter's rotational axis, thereby to permit balls of different diameters to arrange themselves by diameters along the space between the electrodes by tilting of the second electrode relative to the rotary electrode, said second electrode thereby wobbling as the rotary electrode rotates to roll and polish the balls.

13. The apparatus defined in claim 9, and an opposing third electrode spaced from the rotary electrode on the side thereof opposite from the second electrode to receive balls in such latter space also, wherein the drive means rotates the rotary electrode relative to the second and third electrodes, and wherein the energy source terminals are respectively connected to the second and third electrodes.

14. Apparatus for descaling and polishing metal balls comprising a rotary electrode, an opposing second electrode spaced from said rotary electrode to receive the balls in such space, means urging one such electrode toward the other to apply steady contact pressure to such balls, drive means rotating one such electrode relative to the other for rotating the balls while in contact with the surfaces of both electrodes, means immersing the balls and electrode in a dielectric liquid, a sources of electric discharge energy having output terminals respectively connected to at least one of said electrodes for passing electric discharge current through the rolling immersed balls at their points of contact with the electrode surfaces, and means for urging one electrode away from the other, comprising electromagnet means connected for energization by the source and operable thereby to increase and decrease the ball contact pressure, established by the first-mentioned means, responsively to decreases and increases of discharge energy flow through the balls.

References Cited in the file of this patent

UNITED STATES PATENTS

| | | |
|---|---|---|
| 1,333,311 | Holz | Mar. 9, 1920 |
| 2,526,423 | Rudorff | Oct. 17, 1950 |